(12) United States Patent
Salla et al.

(10) Patent No.: US 10,479,926 B2
(45) Date of Patent: Nov. 19, 2019

(54) POLYAMINO-FUNCTIONALIZED NANOPARTICLES AS HARDENERS FOR PARTICULATE CONSOLIDATION

(71) Applicant: Halliburton Energy Services, Inc., Houston, TX (US)

(72) Inventors: Rajender Salla, Maharashtra (IN); Vikesh Singh Baghel, Maharashtra (IN); Philip D. Nguyen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 189 days.

(21) Appl. No.: 15/543,764

(22) PCT Filed: Jan. 19, 2016

(86) PCT No.: PCT/US2016/013926
§ 371 (c)(1),
(2) Date: Jul. 14, 2017

(87) PCT Pub. No.: WO2016/133629
PCT Pub. Date: Aug. 25, 2016

(65) Prior Publication Data
US 2018/0291253 A1    Oct. 11, 2018

(30) Foreign Application Priority Data
Feb. 17, 2015  (IN) .............................. 450/DEL/2015

(51) Int. Cl.
*E21B 43/04*   (2006.01)
*E21B 43/267*  (2006.01)
(Continued)

(52) U.S. Cl.
CPC ............ *C09K 8/5755* (2013.01); *C09K 8/035* (2013.01); *C09K 8/5751* (2013.01); *E21B 43/04* (2013.01);
(Continued)

(58) Field of Classification Search
CPC ... C09K 2208/10; C09K 3/1436; E21B 37/06; E21B 43/16; E21B 43/04; E21B 43/267
See application file for complete search history.

(56) References Cited

U.S. PATENT DOCUMENTS 4,428,426 A   1/1984   Davies et al.
6,211,773 B1  11/2001  Todd et al.
(Continued)

FOREIGN PATENT DOCUMENTS

EP   2092039 B1      7/2011
JP   2001-261936 A   9/2001
WO   2013/191867 A1  12/2013

OTHER PUBLICATIONS

International Preliminary Report on Patentability issued in related PCT Application No. PCT/US2016/013926, dated Aug. 31, 2017 (6 pages).
(Continued)

*Primary Examiner* — Zakiya W Bates
(74) *Attorney, Agent, or Firm* — Thomas Rooney; Baker Botts L.L.P.

(57) ABSTRACT

Systems and methods for stabilizing portions of a subterranean formation, including portions of a subterranean formation having unconsolidated particulates, using a consolidating agent comprising polyamino-functionalized nanoparticles are provided. Certain of the methods include the steps of providing a treatment fluid comprising a base liquid and polyamino-functionalized nanoparticles; and introducing the treatment fluid into a portion of a subterra-
(Continued)

nean formation. Treatment fluids comprising polyamino-functionalized nanoparticles include gravel packing fluids, consolidation fluids, and hydraulic fracturing fluids are also provided.

16 Claims, 3 Drawing Sheets

(51) Int. Cl.
*E21B 43/22* (2006.01)
*C09K 8/575* (2006.01)
*C09K 8/035* (2006.01)

(52) U.S. Cl.
CPC ........ *E21B 43/267* (2013.01); *C09K 2208/10* (2013.01)

(56) References Cited

U.S. PATENT DOCUMENTS

| | | |
|---|---|---|
| 8,261,833 B2 | 9/2012 | Nguyen et al. |
| 8,518,208 B2 | 8/2013 | Kohli |
| 2005/0194142 A1 | 9/2005 | Nguyen et al. |
| 2008/0160289 A1 | 7/2008 | Lin |
| 2010/0314114 A1* | 12/2010 | Moradi-Araghi ........ C09K 8/12 166/305.1 |
| 2015/0153472 A1* | 6/2015 | Tour .......................... G01V 3/26 324/345 |

OTHER PUBLICATIONS

Buchman, Yekaterina Kapilov, et al. "Silica nanoparticles and polyethyleneimine (PEI)-mediated functionalization: a new method of PEI covalent attachment for siRNA delivery applications." Bioconjugate chemistry 24.12 (2013): 2076-2087.

Ukaji, Masayoshi, et al. "Curing of epoxy resin by hyperbranched poly (amidoamine)-grafted silica nanoparticles and their properties." Polymer journal 40.7 (2008): 607.

Lin, Jian-Tao, et al. "Mesoporous silica nanoparticles with controlled loading of cationic dendrimer for gene delivery." Materials Research Express 1.3 (2014): 035403.

Lou, Xiong Wen David, Lynden A. Archer, and Zichao Yang. "Hollow micro-/nanostructures: Synthesis and applications." Advanced Materials 20.21 (2008): 3987-4019.

International Search Report and Written Opinion issued in related PCT Application No. PCT/US2016/013926 dated Apr. 25, 2016, 9 pages.

* cited by examiner

POLYAMINO-FUNCTIONALIZED NANOPARTICLES AS HARDENERS FOR PARTICULATE CONSOLIDATION

CROSS-REFERENCE TO RELATED APPLICATION

The present application is a U.S. National Stage Application of International Application No. PCT/US2016/013926 filed Jan. 19, 2016 which claims priority to Indian Patent Application No. 450/DEL/2015 filed Feb. 17, 2015, both of which are incorporated herein by reference in their entirety for all purposes.

BACKGROUND

The present disclosure relates to systems and methods for stabilizing portions of a subterranean formation, including portions of a subterranean formation comprising unconsolidated particulates.

Treatment fluids can be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, consolidation operations, and the like.

Hydrocarbon-producing wells are often stimulated by hydraulic fracturing treatments. Hydraulic fracturing operations generally involve pumping a fracturing fluid into a well bore that penetrates a subterranean formation at a sufficient hydraulic pressure to create or enhance one or more cracks, or "fractures," in the subterranean formation. "Enhancing" one or more fractures in a subterranean formation, as that term is used herein, is defined to include the extension or enlargement of one or more natural or previously created fractures in the subterranean formation. The fracturing fluid may comprise particulates, often referred to as "proppant" particulates, that are deposited in the fractures. The proppant particulates function, inter alia, to prevent the fractures from fully closing upon the release of hydraulic pressure, forming conductive channels through which fluids may flow to the well bore.

Hydrocarbon-producing wells also may undergo gravel packing treatments, inter alia, to reduce the migration of unconsolidated formation particulates into the well bore. In gravel-packing treatments, a treatment fluid suspends particulates (commonly referred to as "gravel" particulates) to be deposited in a desired area in a well bore, e.g., near unconsolidated or weakly consolidated formation zones, to form a gravel pack to enhance sand control. The gravel can optionally be coated with a resin or consolidating agent. One common type of gravel-packing operation involves placing a sand control screen in the well bore and packing the annulus between the screen and the well bore with the gravel particulates of a specific size designed to prevent the passage of formation sand. The gravel particulates act, inter alia, to prevent the formation particulates from occluding the screen or migrating with the produced hydrocarbons, and the screen acts, inter alia, to prevent the particulates from entering the production tubing. Once the gravel pack is substantially in place, the viscosity of the treatment fluid may be reduced to allow it to be recovered.

In some situations, fracturing and gravel-packing treatments are combined into a single treatment (commonly referred to as "frac pack" operations). In such "frac pack" operations, the treatments are generally completed with a gravel pack screen assembly in place with the hydraulic fracturing treatment being pumped through the annular space between the casing and screen. In this situation, the hydraulic fracturing treatment ends in a screen-out condition, creating an annular gravel pack between the screen and casing. In other cases, the fracturing treatment may be performed prior to installing the screen and placing a gravel pack.

Occasionally, sand, formation fines, gravel, proppant, and/or other unconsolidated particulates placed in the subterranean formation during a fracturing, gravel packing, or frac pack operation may migrate out of the subterranean formation into a well bore and/or may be produced with the oil, gas, water, and/or other fluids produced by the well. The presence of such particulates in produced fluids is undesirable in that the particulates may abrade pumping and other producing equipment and/or reduce the production of desired fluids from the well. Moreover, particulates that have migrated into a well bore (e.g., inside the casing and/or perforations in a cased hole), among other things, may clog portions of the well bore, hindering the production of desired fluids from the well. The term "unconsolidated particulates," and derivatives thereof is defined herein to include loose particulates and particulates bonded with insufficient bond strength to withstand the forces created by the production of fluids through the formation. Unconsolidated particulates may comprise, among other things, sand, gravel, fines and/or proppant particulates in the subterranean formation.

There are several known techniques used to control particulate migration, some of which may involve the use of consolidating agents. The term "consolidating agent" as used herein includes any compound that is capable of minimizing particulate migration in a subterranean formation and/or modifying the stress-activated reactivity of subterranean fracture faces and other surfaces in subterranean formations. One technique that may be used to control particulate migration involves coating proppant particulates with a consolidating agent to facilitate their consolidation within the formation and to prevent their subsequent flowback through the conductive channels in the subterranean formation. Another method used to control particulate migration involves consolidating unconsolidated portions of subterranean zones into relatively stable permeable masses by applying a consolidating agent to an unconsolidated portion of the subterranean formation. One example of this method is applying a resin to a portion of the zone, followed by a spacer fluid and then a hardening agent.

BRIEF DESCRIPTION OF THE DRAWINGS

These drawings illustrate certain aspects of some of the embodiments of the present disclosure, and should not be used to limit or define the claims.

Figure 1:
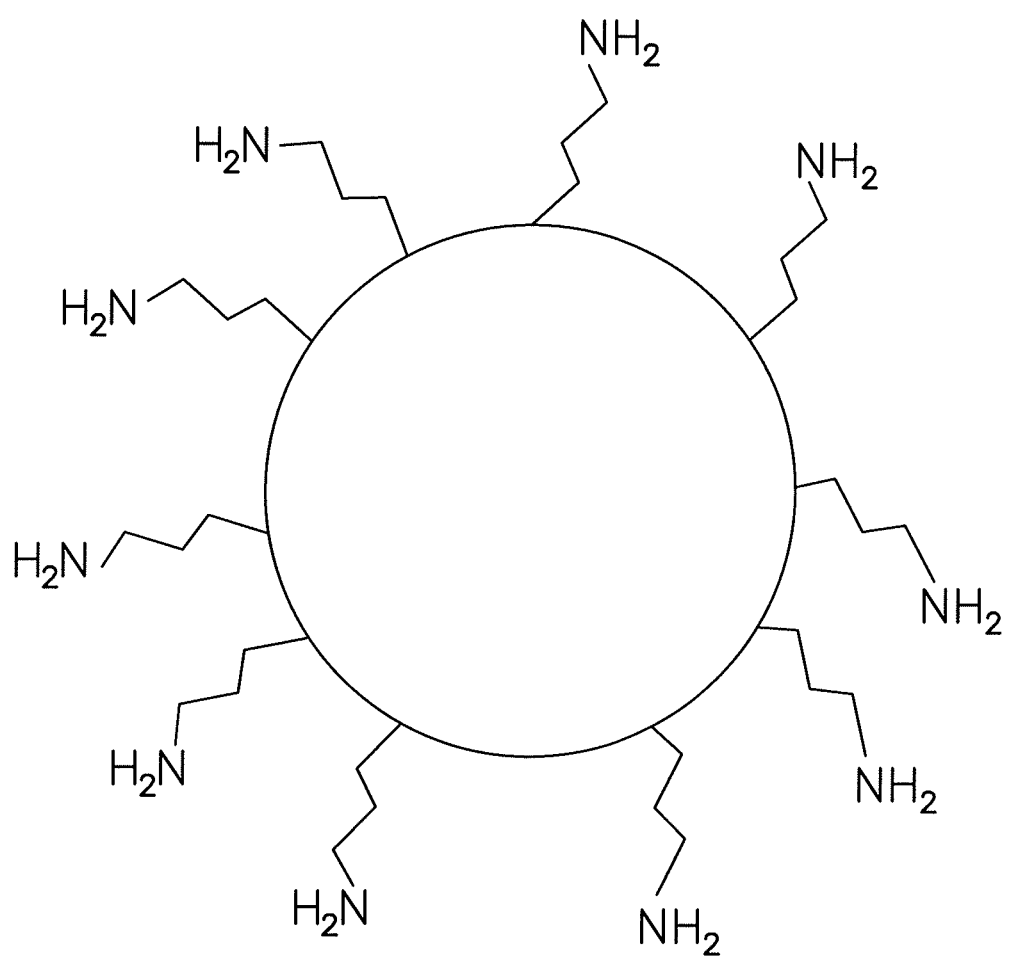
FIG. 1 is a schematic illustration of a first representative polyamino-functionalized nanoparticle having linear amino-functionalized polymers according to certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to systems and methods for stabilizing portions of a subterranean formation, including portions of a subterranean formation comprising unconsolidated particulates, using polyamino-functionalized nanoparticles.

The subterranean formations treated using the methods and compositions of the present disclosure may be any subterranean formation wherein unconsolidated particulates reside in the formation. These unconsolidated particulates may comprise, among other things, sand, gravel, fines and/or proppant particulates within the open space of one or more fractures in the subterranean formation (e.g., unconsolidated particulates that form a proppant pack or gravel pack within the formation). Using the consolidation fluids and methods of the present disclosure, the unconsolidated particulates with the formation may be prophylactically or remedially treated to consolidate the particulates into a cohesive, consolidated, yet permeable pack and minimize or reduce their production with production fluids.

As generally embodied herein, the present disclosure provides treatment fluids comprising a base liquid and polyamino-functionalized nanoparticles, and methods of treating therewith a subterranean formation or a portion of a subterranean formation. The polyamino-functionalized nanoparticles can together constitute a hardening agent or a component thereof, and can in certain embodiments be cross-linkable with a hardenable resin to form a consolidating agent for consolidation of particulates in a subterranean formation.

The presently disclosed treatment fluids may be suitable for use in all operations involving the application of a consolidating agent comprising a hardening agent to a portion of a subterranean formation. Accordingly, as embodied herein, the treatment fluid can be, for example and without limitation, one or more of a fracturing fluid, a consolidating fluid, a gravel pack fluid, a sealing fluid, a workover fluid, and/or a remediation fluid. The term "hardening agent" as used herein will refer to a composition that effects the hardening of a resin composition by any means or mechanism. The term "resin" as used herein refers to any of numerous known polymerized synthetics or chemically modified natural resins including thermoplastic materials and thermosetting materials. In certain embodiments of the present disclosure, one or more hardening agents comprising polyamino-functionalized nanoparticles can cross-link with one or more hardenable resins in situ to form a consolidating agent. The consolidating agent in turn can enhance the contact between the individual particulates within the formation, helping to bring about the consolidation of the particulates into a cohesive and permeable mass.

The treatment fluids of the present disclosure generally comprise a base fluid and a hardening agent comprising polyamino-functionalized nanoparticles as disclosed. By way of example, and not limitation, the polyamino-functionalized nanoparticles can comprise inorganic nanoparticles onto the surfaces of which polymers having terminal amino functionalities are grafted. The polymers can be linear or branched, and can be extensively branched (i.e., hyperbranched) in certain embodiments to provide a high ratio of reactive amino functionalities per nanoparticle. The density of surface modification and the extent of polymer branching can be selected or modified as desired to alter the density of cross-linking and the resulting physical properties, including thermal stability and glass transition temperature, of the cross-linked resin compositions. Additionally, and as described herein, the terminal amino functionalities can be modified or protected to modify curing time and temperature as desired.

In certain embodiments, the disclosed hardening additives can be thermally curable at elevated temperatures within the range of temperatures encountered downhole in situ within a subterranean formation. As generally embodied herein, the polyamino-functionalized nanoparticles and the hardenable resin composition can react under suitable conditions as desired and as specified herein to cross-link with one another to consolidate a portion of a subterranean formation. A person of ordinary skill in the art, with the benefit of this disclosure, will be able to select an appropriate hardening agent comprising polyamino-functionalized nanoparticles suitable for use with a selected subterranean formation treatment or operation.

Without limiting the disclosure to any particular theory or mechanism, it is believed that the high density of reactive functional groups achievable on the polyamino-functionalized nanoparticles and the ability of the polyamino-functionalized nanoparticles to cross-link in multiple directions and in three dimensions permits incorporation of the polyamino-functionalized nanoparticles into highly adhesive resin polymer networks. Accordingly, among the many potential advantages to the methods and compositions of the present disclosure, only some of which are alluded to herein, the methods, compositions, and systems of the present disclosure may provide strongly adherent consolidating agents having high mechanical bonding strength and thermal integrity. In certain embodiments, the disclosed consolidating agents can exhibit significantly higher thermal stability and glass transition temperature than consolidating agents containing conventional amino hardening agents, and can permit reduced treatment fluid loading of resins and hardening additives relative to treatment fluids containing conventional hardening additives.

Figure 2:
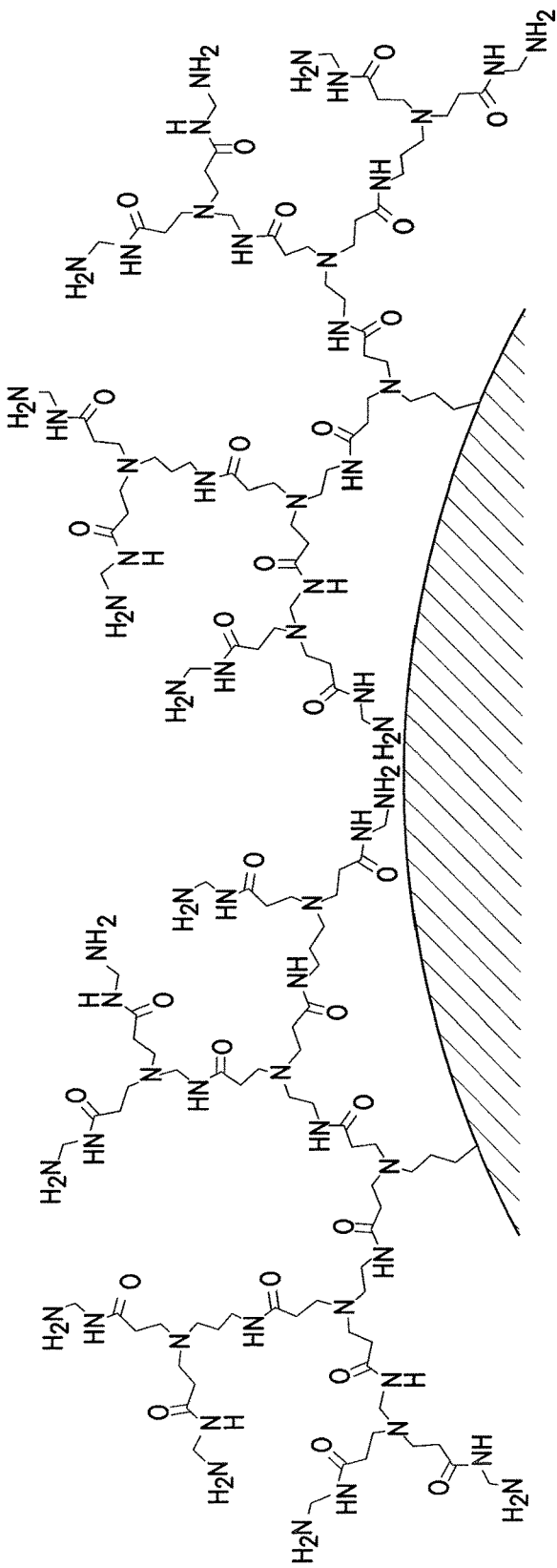
FIG. 2 is a schematic illustration of a second representative polyamino-functionalized nanoparticle having branched, polyamino-functionalized polymers according to certain embodiments of the present disclosure.

Reference will now be made to certain representative and non-limiting embodiments of polyamino-functionalized nanoparticles according to the present disclosure. As depicted at FIG. 1 and FIG. 2, a representative polyamino-functionalized nanoparticle as embodied herein generally comprises a nanoparticle core having one or more amino- or polyamino-terminated polymers bound on its surface. Accordingly, as used herein, the term "polyamino-functionalized nanoparticle" will generally refer to a particulate composition of matter having a diameter, or, if non-spherical, a maximum diameter or length of less than about 1 µm and having at least one amino- or polyamino-terminated polymer on its surface.

The nanoparticle cores can be composed of any suitable material having a maximum diameter or length of less than 1 µm. By way of example and not limitation, the nanoparticle core can be composed of an inorganic material, such as a ceramic material. Suitable inorganic materials according to the present disclosure include, by way of example and not limitation, nanoparticles of silica ($SiO_2$), alumina ($Al_2O_3$), iron oxide ($Fe_3O_4$ and $Fe_2O_3$), nickel oxide (NiO), zinc oxide (OZn), magnesium oxide (MgO), boron nitride (BN), and aluminum nitride (AlN). In alternative embodiments, the nanoparticle core can be composed of carbon, such as graphitic carbon nanoparticles and carbon black nanoparticles. Accordingly, the maximum diameter or length of the nanoparticle cores can be between about 1 nm and about 1 µm, or between about 10 nm and about 500 nm. The average maximum diameter or length of the nanoparticles can be less than about 1 µm, such as between about 10 nm to about 500 nm, or about 50 nm to about 500 nm, or about 100 nm to about 500 nm, or about 200 nm to about 500 nm, or 10 nm to about 100 nm, or about 10 nm to about 200 nm.

The amino- or polyamino-terminated polymers can likewise have any suitable composition. As depicted in FIG. 1, the polymers can be linear amino-functionalized polymers. In additional or alternative embodiments, and as depicted in FIG. 2, the polymers can be branched polyamines. Suitable linear amino-functionalized polymers include, for example, amino-terminated $C_1$-$C_6$ alkanes. By way of example and not limitation, the polyamino-terminated polymers can be selected from polyethyleneimine ("PEI"), polypropyleneimine ("PPI"), polyamidoamine ("PAMAM"), polylysine, poly(dimethylaminoethyl methacrylate) ("PDMAEMA"), and combinations thereof.

The polyamino-functionalized nanoparticles can be synthesized by conventional methods. For example, silica nanoparticles can be surface-modified by reaction with tetraethylorthosilicate to generate reactive hydroxyl residues on the surface of the nanoparticles. Amino-terminated polymers can subsequently be covalently bound to the surface of the surface-modified nanoparticles by reaction with an aminosilane, such as 3-aminopropyl-triethoxysilane, to yield the polyamino-functionalized nanoparticles depicted schematically in FIG. 1. The resulting linear amino-terminated polymers bound to the surface of the nanoparticles can be modified as desired to generated branched or hyperbranched polyamino-terminated polymers by conventional techniques known in the art. The amino residues of the linear amino- or branched polyamino-terminated polymers can subsequently be protected or modified, such as by reaction with boron trifluoride, to increase cross-linking temperature and/or cross-linking time, as desired and as known in the art.

Each nanoparticle can comprise a plurality of amino-terminated polymers. In certain embodiments, the amino-terminated polymers can be chemically grafted onto the surface of the nanoparticles, such as by surface modification of the nanoparticles and subsequent covalent bonding of amino-terminated polymers or precursors thereof. In certain embodiments, each nanoparticle includes comprise ten or more amino-terminated polymers, or twenty or more amino-terminated polymers, or fifty or more amino-terminated polymers. The extent of polymer branching of the polyamino-terminated polymers can be selected as desired, with more extensive branching correlating with greater adhesive bonding strength and thermal stability after curing. In certain embodiments, the polyamino-terminated polymers (e.g., polyamines) can be "hyper-branched" or "dendritic." In certain embodiments, each nanoparticle can comprise up to 200 terminal amino functionalities, or up to 500 terminal amino functionalities or more per polymer. The polyamino-terminated polymers can have a molecular weight of at least 100 g/mol, or at least 500 g/mol, or at least 5,000 g/mol, as desired.

In further embodiments in accordance with the present disclosure, all or a portion of the amino terminal functional groups of the polyamino-terminated polymers can be chemically modified or converted to an alternative curing functionality. For example, and not by way of limitation, the amino terminal functional groups of the amino terminal polymers can be modified to incorporate boron trifluoride ($BF_3$) to form terminal amine-$BF_3$ complex groups. Consolidating agents of the present disclosure containing such modified amino termini can exhibit thermal stability (i.e., retain cross-linking at elevated temperatures) at even greater temperatures than the consolidating agents of the present disclosure comprising unmodified polyamino-functional polymers. The inclusion of alternative curing functionalities can also delay curing, which can in turn beneficially ensure that curing occurs at suitable or desired locations downhole.

In certain embodiments of the present disclosure, the consolidating agents comprising an polyamino-functionalized nanoparticle can have a curing temperature of at least about 120° F., or at least about 160° F., or at least about 200° F. In additional or alternative embodiments, the consolidating agents comprising an polyamino-functionalized nanoparticle can have a glass transition temperature of at least about 120° F., or at least about 160° F., or at least about 200° F. The curing temperature of the consolidating agents can suitably be lower than the downhole temperature of the subterranean formation or portion thereof into which they are introduced, while the glass transition temperature of the consolidating agents can suitably be greater than the downhole temperature of the subterranean formation or portion thereof into which they are introduced. Furthermore, in certain embodiments, the thermal stability and/or the glass transition temperature of the consolidating agents comprising an polyamino-functionalized nanoparticle can depend on, and increase with, curing temperature. Accordingly, hardening agents comprising an polyamino-functionalized nanoparticle of the present disclosure can be selected for their suitability for treatment of a subterranean formation based on, inter alia, the downhole temperature of the subterranean formation. Additionally, hardening agents of the present disclosure comprising an polyamino-functionalized nanoparticle can be suitable for a variety of downhole conditions and operations.

The polyamino-functionalized nanoparticle hardening agents of the present disclosure can be included in the treatment fluid in an amount sufficient to at least partially harden a resin composition provided therewith or via separate treatment fluid. In some embodiments of the present disclosure, the polyamino-functionalized nanoparticle hardening agents are included in the treatment fluid at a concentration of about 0.1% volume by weight to about 20% volume by weight, or about 0.1% volume by weight to about 5% volume by weight.

The polyamino-functionalized nanoparticle hardening agents of the present disclosure can cross-link upon curing with a hardenable resin to form a consolidating agent comprising a polymerized resin network. Hardenable resins suitable for use as an adhesive substance in the methods of the present disclosure include all resins known in the art that are capable of forming a hardened, consolidated mass. Many such resins are commonly used in subterranean consolidation operations, and some suitable resins include epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof. Some suitable resins, such as epoxy resins, can be cured with an internal catalyst or activator so that when pumped down hole, they may be cured using only time and temperature. Other suitable resins, such as furan resins generally require a time-delayed catalyst or an external catalyst to help activate the polymerization of the resins if the cure temperature is low (i.e., less than 250° F.), but will cure under the effect of time and temperature if the formation temperature is above about 250° F., preferably above about 300° F. It is within the ability of one skilled in the art, with the benefit of this disclosure, to select a suitable resin for use in embodiments of the present disclosure and to determine whether a catalyst is required to trigger curing.

The type and amount of the polyamino-functionalized nanoparticle hardening agent and hardenable resin composition included in a particular treatment fluid or method of the disclosure may depend upon, among other factors, the composition and/or temperature of the subterranean formation, the chemical composition of formations fluids, flow rate of fluids present in the formation, the effective porosity and/or permeability of the subterranean formation, pore throat size and distribution, and the like. Furthermore, the concentration of the consolidating agent can be varied, inter alia, to either enhance bridging to provide for a more rapid coating of the consolidating agent or to minimize bridging to allow deeper penetration into the subterranean formation. It is within the ability of one skilled in the art, with the benefit of this disclosure, to determine the type and amount of consolidating agent to include in the consolidating agent emulsions of the present disclosure to achieve the desired results.

As noted, the hardening agent can be provided in the treatment fluid in an amount to at least partially harden the resin. In particular embodiments, the hardening agent may be present in the consolidation fluid in a stoichiometric ratio with the resin. In those embodiments in which the hardening agent comprises multiple polyamino-terminated polymers per nanoparticle and/or highly branched polyamino-terminated polymers having a high number of polyamino-terminal (or chemically modified polyamino-terminal) functionalities, the molar ratio of the polyamino-functionalized nanoparticles to the hardenable resin composition can be significantly lower. Given a particular combination of resin and hardening agent, one of ordinary skill in the art will be able to determine an appropriate amount of hardening agent to use in a particular application. In those treatment fluids of the present disclosure comprising both a hardenable resin and a hardening agent comprising polyamino-functionalized nanoparticles, the hardenable resin may be included in the treatment fluid in an amount in the range of about 0.1% to about 20% by weight of the treatment fluid. It is within the ability of one skilled in the art with the benefit of this disclosure to determine how much of the hardenable resin component may be needed to achieve the desired results. Factors that may affect this decision include which type of hardenable resin component and hardening agent comprising polyamino-functionalized nanoparticles are used.

The treatment fluids used in the methods and systems of the present disclosure may comprise any base fluid known in the art, including aqueous base fluids, non-aqueous base fluids, and any combinations thereof. The term "base fluid" refers to the major component of the fluid (as opposed to components dissolved and/or suspended therein), and does not indicate any particular condition or property of that fluids such as its mass, amount, pH, etc. Aqueous fluids that may be suitable for use in the methods and systems of the present disclosure may comprise water from any source. Such aqueous fluids may comprise fresh water, salt water (e.g., water containing one or more salts dissolved therein), brine (e.g., saturated salt water), seawater, or any combination thereof. In most embodiments of the present disclosure, the aqueous fluids comprise one or more ionic species, such as those formed by salts dissolved in water. For example, seawater and/or produced water may comprise a variety of divalent cationic species dissolved therein. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate. Examples of non-aqueous fluids that may be suitable for use in the methods and systems of the present disclosure include, but are not limited to, oils, hydrocarbons, organic liquids, and the like. In certain embodiments, the treatment fluids may comprise a mixture of one or more fluids and/or gases, including but not limited to emulsions, foams, and the like. The base fluid may be present in the treatment fluid in an amount in the range of about 20% to about 99.9% by weight or in an amount in the range of about 60% to about 99.9% by weight of the consolidating agent emulsion composition. or in an amount in the range of about 95% to about 99.9% by weight of the treatment fluid.

In certain embodiments, the treatment fluids used in the methods and systems of the present disclosure optionally may comprise any number of additional additives. Examples of such additional additives include, but are not limited to, salts, surfactants, acids, proppant particulates, diverting agents, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, additional $H_2S$ scavengers, $CO_2$ scavengers, oxygen scavengers, lubricants, additional viscosifiers, breakers, weighting agents, relative permeability modifiers, resins, wetting agents, coating enhancement agents, filter cake removal agents, antifreeze agents (e.g., ethylene glycol), and the like. In certain embodiments, one or more of these additional additives (e.g., a crosslinking agent) may be added to the treatment fluid and/or activated after the viscosifying agent has been at least partially hydrated in the fluid. A person skilled in the art, with the benefit of this disclosure, will recognize the types of additives that may be included in the fluids of the present disclosure for a particular application.

For example, in certain embodiments, a treatment fluid, such as a consolidation fluid, may also include a surfactant, which facilitates the coating of the resin onto the particulates. Examples of suitable surfactants include, but are not limited to, alkyl phosphonate surfactants (e.g., a $C_{12}$-$C_{22}$ alkyl phosphonate surfactant), ethoxylated nonyl phenol phosphonate esters, cationic surfactants, nonionic surfactants, and mixtures of one or more cationic and nonionic surfactants. Generally, the surfactant is present in the consolidation fluid in an amount sufficient to facilitate the wetting of the proppant or other particulate matter being consolidation. In particular embodiments, the surfactant may be present in the consolidation fluid in an amount from about 0.1% w/v to about 5% w/v.

Likewise, in certain embodiments, the treatment fluid can also comprise a silane coupling agent, which facilitates the adhesion of the resin to the particulates. The optional silane coupling agent may be used, among other things, to act as a mediator to help bond the resin to formation particulates or proppant particulates. Examples of suitable silane coupling agents include, but are not limited to, N-β-(aminoethyl)-γ-aminopropyl trimethoxysilane, N-2-(aminoethyl)-3-aminopropyltrimethoxysilane, 3-glycidoxypropyl-trimethoxysilane, and mixtures thereof. The silane coupling agent may be included in the treatment fluid in an amount capable of sufficiently bonding the resin to the particulate. In some embodiments of the present disclosure, the silane coupling agent used is included in a treatment fluid in an amount from about 0.1% w/v to about 5% w/v.

In certain embodiments, a curing agent can be provided in the treatment fluids to promote cross-linking of the polyamino-functionalized nanoparticles and a hardenable resin compound. By way of example, the curing agent may be a phenolic compound, an amine compound, an imide compound, an amide compound, a barbituric acid derivative, a cyanuric acid derivative, a thio phenolic compound, or a carboxylic acid compound. Suitable phenolic compounds include phenol, cresol, resorcinol, o-cresol, m-cresol, p-cresol, chlorophenol, nitrophenol, bromophenol, dinitrophenol, hydroquinone, pyrocatechol, pyrogallol, hydroxyhydroquinone, 2-methoxyphenol, 2,5-dichlorophenol, 3-acetoxyphenol, m-aminophenol, p-aminophenol, 4,4'-dihydroxydiphenylpropane, 4,4'-dihydroxydiphenylmethane, 3,3'-dihydroxydiphenylpropane, 4,4'-dihydroxy diphenyl ether, 4,4'-dihydroxydiphenylethane, 4,4'-dihydroxy diphenyl ketone, 2-allylphenol and 2-allylcresol, derivatives thereof, and combinations thereof. Suitable amine compounds include dialkyltoluenediamine, phenylenediamine, diaminodiphenylmethane, diaminodiphenyl ether, diaminodiphenyl sulfone (such as 4,4'-diaminodiphenylsulfone), diaminodiphenyl sulfide, aminophenylalkylaniline (such as 4[(4-aminophenyl)methyl]aniline), an aromatic amine compound comprising a halogen-substituted derivative or an alkyl-substituted derivative of the compounds mentioned above, an amine compound obtained by the reaction between aniline or an aniline derivative and an aldehyde compound, and an amino phenol derivative having both a hydroxyl group and an amino group in a molecule, and combinations thereof.

In certain embodiments of the treatment fluids of the present disclosure which comprise a liquid hardenable resin compound, a solvent can be added to the resin to reduce its viscosity for ease of handling, mixing and transferring. It is within the ability of one skilled in the art with the benefit of this disclosure to determine if and how much solvent may be needed to achieve a viscosity suitable to the subterranean conditions. Factors that may affect this decision include geographic location of the well, the surrounding weather conditions, and the desired long-term stability of the consolidating agent emulsion. An alternate way to reduce the viscosity of the hardenable resin is to heat it. Any solvent that is compatible with the hardenable resin and achieves the desired viscosity effect may be suitable for use in the liquid hardenable resin component. Suitable solvents may include butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d'limonene, fatty acid methyl esters, and combinations thereof. Other suitable solvents may include aqueous dissolvable solvents such as, methanol, isopropanol, butanol, glycol ether solvents, and combinations thereof. Suitable glycol ether solvents include, but are not limited to, diethylene glycol methyl ether, dipropylene glycol methyl ether, 2-butoxy ethanol, ethers of a $C_2$ to $C_6$ dihydric alkanol containing at least one $C_1$ to $C_6$ alkyl group, mono ethers of dihydric alkanols, methoxypropanol, butoxyethanol, hexoxyethanol, and isomers thereof. Selection of an appropriate solvent is dependent on the resin composition chosen and is within the ability of one skilled in the art with the benefit of this disclosure.

In certain embodiments of the disclosed methods and systems, flexibilizer additives may be used to provide flexibility to the cured consolidating agents. Examples of suitable flexibilizer additives include, but are not limited to, an organic ester, an oxygenated organic solvent, an aromatic solvent, and combinations thereof. In certain embodiments, flexibilizer additive can be an ether, such as dibutyl phthalate. Where used, the flexibilizer additive may be included in the treatment fluid in an amount in the range of from about 0.05% to about 10%, or in the range of from about 20% to about 45% by weight of the hardenable resin.

The present disclosure in some embodiments provides methods for using the treatment fluids to carry out a variety of subterranean treatments, including but not limited to, hydraulic fracturing treatments, gravel pack treatments, particulate consolidation and remediation treatments, workover treatments, and combinations thereof (e.g., "frac pack treatments).

In some embodiments, the treatment fluids of the present disclosure may be used in treating a portion of a subterranean formation, for example, in particulate consolidation treatments. In certain embodiments, a treatment fluid may be introduced into a subterranean formation. In some embodiments, the treatment fluid may be introduced into a well bore that penetrates a subterranean formation.

In additional or alternative embodiments, the treatment fluids may be used on a well bore having a screen or liner in place, wherein the disclosed hardening additives are placed in the formation by injecting them directly through the screen or liner. Also by way of example, the treatment fluids may be used on a well bore having a gravel pack in place (with or without a screen or liner in place), wherein the disclosed hardening additives are placed in the formation by injecting them directly through the gravel pack as a means to prevent damage due to formation fines migration or as a remedial treatment to cure a sand production problem. In addition, the treatment fluids may be used to help reduce proppant flowback from a propped fracture by introducing the disclosed hardening additives into a fracture so as to contact unconsolidated particulates (be they proppant or formations fines) and a hardenable resin composition to consolidate the unconsolidated particulates in place once the operation is complete.

In certain embodiments, after application of the treatment fluid (and any pre-flush or post-flush fluids), the well may be shut in for a period of time to allow the polyamino-functionalized nanoparticle hardening agent and hardenable resin composition to cure. The amount of time necessary for the polyamino-functionalized nanoparticle hardening agent and hardenable resin composition to cure sufficiently may depend on temperature and/or the compositions of the hardening agent and resin. After the polyamino-functionalized nanoparticle hardening agent and hardenable resin composition have sufficiently cured, the well may be returned to production.

As stated above, the methods of the present disclosure may be employed in any subterranean treatment where unconsolidated particulates reside in the formation. These unconsolidated particulates may comprise, among other things, sand, gravel, fines and/or proppant particulates within the open space of one or more fractures in the subterranean formation (e.g., unconsolidated particulates that form a proppant pack or gravel pack within the formation). Using the consolidation fluids and methods of the present disclosure, the unconsolidated particulates within the formation may be remedially treated to consolidate the particulates into a cohesive, consolidated, yet permeable pack and minimize or reduce their production with production fluids.

In some embodiments, the polyamino-functionalized nanoparticle hardening agents of the present disclosure may be coated on particulates to be used in a fracturing or gravel packing process like those described above. The term "coated" implies no particular degree of coverage or mechanism by which the consolidating agent becomes incorporated with the particulates. The term includes, but is not limited to, simple coating, adhesion, impregnation, etc. The resultant coated particulates may be introduced as part of a fracturing or gravel packing process, at any point during one of the methods described above. For example, the coated particulates can be introduced towards the end of a fracturing or gravel packing treatment so that the maximum economic benefit can be obtained.

In accordance with the methods and compositions of this aspect of the present disclosure, all or part of the particulates may be coated (preferably on-the-fly) with a polyamino-functionalized nanoparticle hardening agents of the present disclosure and may then be suspended in a fracturing fluid or used as part of a gravel packing process. The consolidating agent emulsions are used to coat the consolidating agent on dry particulates while the particulates are conveyed in a conveying and/or mixing device. The amount of consolidating agent coated on the particulates can be in the range of about 0.1% to about 10%, or about 1% to about 3% w/v.

The term "on-the-fly" is used herein to mean that a flowing stream is continuously introduced into another flowing stream so that the streams are combined and mixed while continuing to flow as a single stream. The coating of the dry particulates with the consolidating agent emulsions and any mixing of the consolidating agent coated particulates with a fracturing fluid or treatment fluid can all be performed on-the-fly. However, as is well understood by those skilled in the art, such mixing can also be accomplished by batch mixing or partial batch mixing.

A wide variety of particulate materials may be used in accordance with this aspect of the present disclosure, including, but not limited to, sand, bauxite, ceramic materials, glass materials, resin pre-coated proppant (e.g., commercially available from Borden Chemicals and Santrol, for example, both from Houston, Tex.), polymer materials, TEFLON (tetrafluoroethylene) materials, nut shells, ground or crushed nut shells, seed shells, ground or crushed seed shells, fruit pit pieces, ground or crushed fruit pits, processed wood, composite particulates prepared from a binder with filler particulate including silica, alumina, fumed carbon, carbon black, graphite, mica, titanium dioxide, meta-silicate, calcium silicate, kaolin, talc, zirconia, boron, fly ash, hollow glass microspheres, solid glass, and mixtures thereof. The particulate material used may have a particle size in the range of about 2 to about 400 mesh, U.S. Sieve Series. Preferably, the particulate material is graded sand having a particle size in the range of about 10 to about 70 mesh, U.S. Sieve Series. Preferred sand particle size distribution ranges are one or more of 10-20 mesh, 20-40 mesh, 40-60 mesh or 50-70 mesh, depending on the particle size and distribution of the formation particulates to be screened out by the particulate materials. Other particulates that may be suitable for use in subterranean applications also may be useful.

Certain embodiments of the methods of this aspect of the present disclosure can generally include the steps of providing a coating composition comprising of an polyamino-functionalized nanoparticle hardening agent and, optionally, a hardenable resin composition. The coating further optionally can comprise on or more of a silane coupling agent, a solvent for the hardenable resin composition, a hydrolyzable ester breaker additive, and a surfactant to facilitate coating and coating flow. The polyamino-functionalized nanoparticle hardening agent can be provided in a suspension in a liquid carrier fluid. Curing of the polyamino-functionalized nanoparticle hardening agent and a hardenable resin composition can be promoted by elevated temperature and pressure in situ, such as in a fracture. The hardening of the resin composition in situ can promote the consolidation of the resin coated particulates into a hard permeable pack having sufficient compressive strength to prevent unconsolidated particulates and formation sand from flowing out of the fractures with produced fluids.

Figure 3:
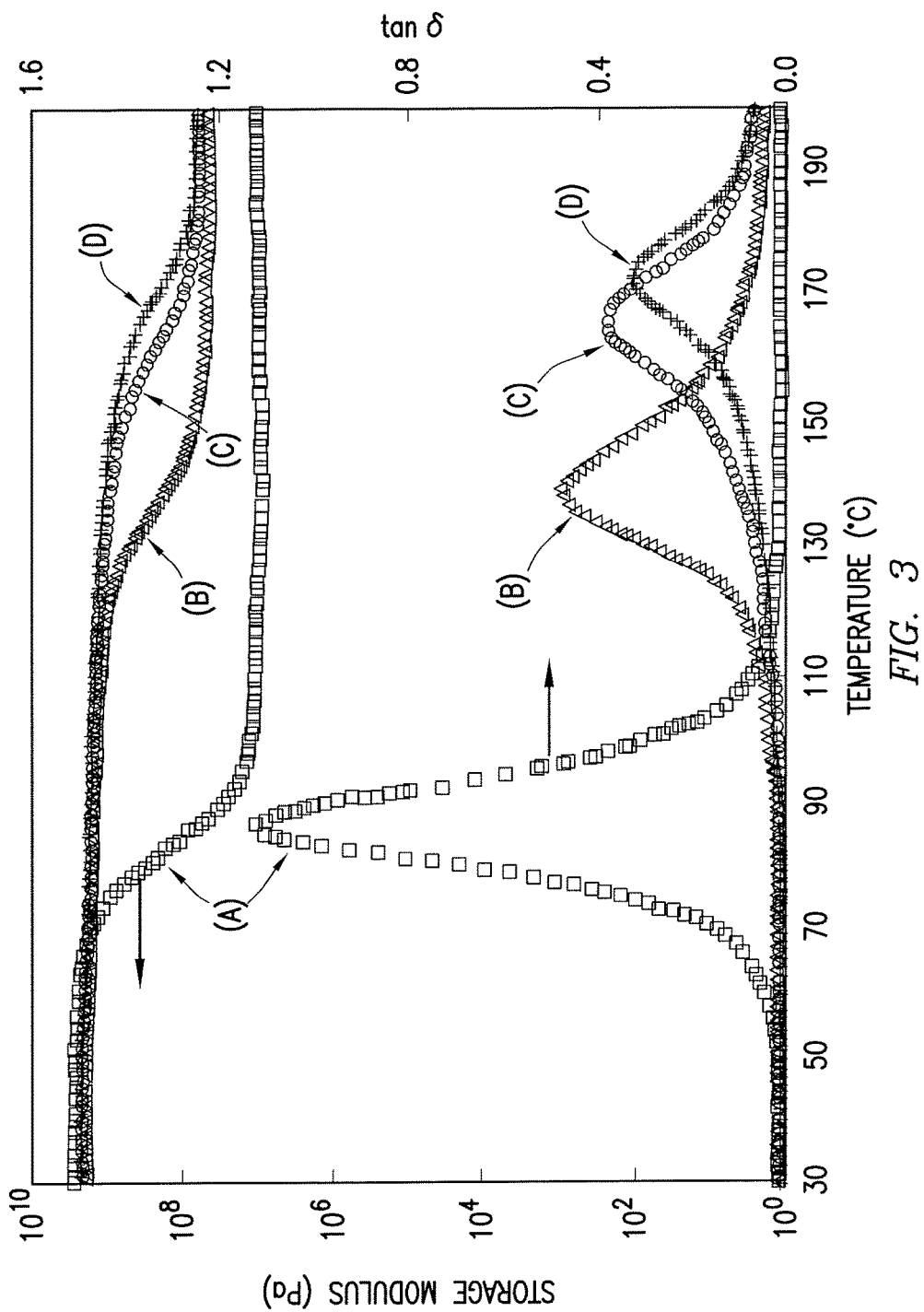
FIG. 3 is a graph depicting curves of storage modulus vs. temperature of epoxy resin compositions cured with (A) a conventional hardening agent; (B) a representative hardening agent comprising polyamino-functionalized nanoparticles at a weight percentage of 15% of the cured composition; (C) a representative hardening agent comprising polyamino-functionalized nanoparticles at a weight percentage of 20% of the cured composition; and (D) a representative hardening agent comprising polyamino-functionalized nanoparticles at a weight percentage of 30% of the cured composition, according to certain embodiments of the present disclosure.

To facilitate a better understanding of the present disclosure, the following examples of certain aspects of preferred embodiments are given. The following examples are not the only examples that could be given according to the present disclosure and are not intended to limit the scope of the disclosure or claims. FIG. 3 is a graph depicting adhesive strength of epoxy resin compositions cured with representative hardening agents comprising polyamino-functionalized nanoparticles according to certain embodiments of the present disclosure, as well as an epoxy resin composition cured by a conventional hardening agent.

EXAMPLES

Example 1—Characterization of Representative Polyamino-Functionalized Nanoparticles Representative hardening agents comprising polyamino-functionalized nanoparticles according to the present disclosure were synthesized, and cured epoxy resin compositions comprising same were tested.

Hyperbranched poly(amidoamine) ("PAMAM")-grafted silica nanoparticles were synthesized according to known methods. Briefly, commercial silica nanoparticles (Nippon Aerosil Company, Ltd., Japan) were obtained and dried in vacuum at 110° C. The surfaces of the silica nanoparticles were functionalized with amino groups by reaction with γ-aminopropyltriethoxysilane. PAMAM was grafted onto the amino functionalities by repeated addition of methyl acrylate followed by amidation of terminal ester groups with ethylenediamine (EDA). The hyperbranched PAMAM-grafted silica nanoparticles so synthesized were treated with boron trifluoride diethyl ether to generate hyperbranched PAMAM-grafted silica nanoparticles having boron trifluoride ($BF_3$) complex groups ("hyperbranched PAMAM-$BF_3$ nanoparticles"). The hyperbranched PAMAM-$BF_3$ nanoparticles were mechanically mixed at a weight ratio of 15%, 20%, or 30% with Bisphenol A epoxy resin (Araldite AER 260, Asahi-Ciba, Japan) prior to curing at 160° C. for 24 hours.

The thermal stability of the mixtures after curing was analyzed by thermogravimetric analysis with a thermogravimetric analyzer (Shimadzu TGA-50) in nitrogen at a temperature range between ambient temperature and 600° C. at a heating rate of 10° C./minute. The adhesive strength of the mixtures between alumina plates was measuring wing an Instron-type tensile machine (Shimadzu AGS-10KNG) at a crosshead speed of 0.2 mm/min at 25° C. and 50% relative humidity. The dynamic mechanical performance of the compositions was evaluated by known techniques. The thermal stability, adhesive strength, and dynamic mechanical performance of epoxy resin cured with a conventional hardener (EDA) in the presence of untreated silica nanoparticles was also evaluated for comparison.

The 10% weight loss temperature (indicative of the upper range of heat tolerance) of the hyperbranched PAMAM-$BF_3$ nanoparticles cured with epoxy resin was 392° C., compared to 348° C. for the epoxy resin cured with EDA and untreated silica nanoparticles. The adhesive strength of the cured hyperbranched PAMAM-$BF_3$ nanoparticles compositions with 15%, 20%, and 30% hyperbranched PAMAM-$BF_3$ nanoparticles and the epoxy resin cured with EDA and untreated silica nanoparticles is shown in Table 1, below. As shown, the hyperbranched PAMAM-$BF_3$ nanoparticles cured with epoxy resin exhibited greater adhesive strength than epoxy resin cured with EDA, and the adhesive strength of the hyperbranched PAMAM-$BF_3$ nanoparticles cured with epoxy resin increased with increasing weight percentage of the hardening agent.

TABLE 1

Adhesive Strength of Cured Epoxy Consolidating Agents

| Hardening Agent | Adhesive Strength After Curing (MPa) |
| --- | --- |
| EDA | 6.5 |
| hyperbranched PAMAM-$BF_3$ (15% w/w) | 9 |
| hyperbranched PAMAM-$BF_3$ (20% w/w) | 10 |
| hyperbranched PAMAM-$BF_3$ (30% w/w) | 11 |

The dynamic mechanical analysis curves of the cured compositions is shown in FIG. 3. As shown, the glass transition temperature of the cured consolidating agents comprising hyperbranched PAMAM-$BF_3$ nanoparticles at weight percentages of 15% (B), 20% (C), and 30% (D) was greater than that of the cured epoxy-EDA consolidating agents (A), and increased with weight percentage of the hardening agent to exceed 170° C. for the cured compositions containing 30% by weight of hyperbranched PAMAM-$BF_3$ nanoparticles. The storage modulus of the cured compositions of hyperbranched PAMAM-$BF_3$ nanoparticles in the rubbery regions and glass transition regions was slightly increased relative to the storage modulus of the epoxy-EDA-nanoparticle compositions in the same regions of the curve.

It was further observed that the glass transition temperature of the cured compositions containing hyperbranched PAMAM-$BF_3$ nanoparticles cured at 160° C. was significantly higher than similar compositions cured at 160° C.

Sand Control Devices

Certain embodiments of the methods and compositions disclosed herein may directly or indirectly affect one or more components or pieces of equipment associated with the preparation, delivery, recapture, recycling, reuse, and/or disposal of the disclosed compositions. For example, sand control devices may be used with the methods and systems of the present disclosure. Such sand control devices are essentially filter assemblies used to retain either formation solids or particulates such as gravel that are placed into the subterranean formation. Suitable sand control devices that may be used in the present disclosure include sand control screens, liners, and combinations thereof. A sand control liner is generally a well bore tubular in which slots (slotted liner) or holes (perforated liner) have been made before the tubular is placed into the well bore. A sand control screen is generally a more flexible filter assembly that may be used in conjunction with a liner or alone. As will be understood by one of ordinary skill in the art, a wide range of sizes and screen configurations are available to suit the characteristics (such as size, spherocity, etc.) of the formation solids or particulates that are meant to be controlled by the device. The sand control device, with or without added gravel, presents a barrier to migrating sand from the formation while still permitting fluid flow.

Any sand control screen or perforated liner known in the art and suitable for the subterranean formation or portion thereof being treated may be used in the embodiments of the present disclosure. One known type of sand control screen commonly used in open hole completions where gravel packing may not be feasible, is expandable sand control screens. Typically, expandable sand control screens are designed to not only filter particulate materials out of the formation fluids, but also provide radial support to the formation to prevent the formation from collapsing into the well bore. Another open hole completion screen type known in the art is a stand alone screen. Typically, stand alone screens may be used when the formation generally comprises a more uniform particle size distribution. Still another known type of sand control screen is a telescoping screen whereby hydraulic pressure is used to extend the telescoping screen radially outwardly toward the well bore. This process requires providing fluid pressure through the entire work string that acts on the telescoping members to shift the members from a partially extended position to a radially extended position. Another type of suitable sand control screen includes a base pipe having at least one opening in a sidewall portion thereof; a swellable material layer disposed exteriorly of the base pipe and having at least one opening corresponding to the at least one opening of the base pipe; a telescoping perforation operably associated with the at least one opening of the base pipe and at least partially disposed within the at least one opening of the swellable material layer; and a filter medium disposed within the telescoping perforation. Still another suitable sand control device can employ a swellable packer activated screen that may provide stand off from the formation to allow filter-cake clean up.

Placement of a sand control screen in a well can include the step of packing an annulus surrounding the sand control screen with gravel, which can be retained by the screen. Accordingly, in certain embodiments of the methods disclosed herein, the treatment fluid is a a gravel packing fluid containing gravel for a gravel packing operation. Certain embodiments of the methods disclosed herein include the steps of providing a sand control screen assembly disposed within a wellbore penetrating a subterranean formation; and forming a gravel pack proximal to the sand control screen assembly with a treatment fluid, wherein the treatment fluid is a gravel packing fluid comprising gravel and a polyamino-functionalized nanoparticle hardening agent according to the present disclosure. In certain embodiments, the polyamino-functionalized nanoparticle hardening agent or a portion thereof can be provided in a coating on the surface of the gravel particulates in the treatment fluid.

Representative Embodiments

An embodiment of the present disclosure is a method comprising: providing a treatment fluid comprising a base liquid and polyamino-functionalized nanoparticles; and introducing the treatment fluid into a portion of a subterranean formation. Another embodiment of the present disclosure is a treatment fluid composition for treating a subterranean formation, the treatment fluid composition comprising a base liquid and polyamino-functionalized nanoparticles. Another embodiment of the present disclosure is a method comprising providing a sand control screen assembly disposed within a wellbore penetrating a subterranean formation; providing a treatment fluid comprising a base fluid, a plurality of gravel particulates, and a hardening agent comprising polyamino-functionalized nanoparticles; and forming a gravel pack proximal to the sand control screen assembly with the gravel packing treatment fluid.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
providing a treatment fluid comprising a base liquid and polyamino-functionalized nanoparticles;
introducing the treatment fluid into a portion of a subterranean formation that comprises unconsolidated particulates;
contacting the portion of the subterranean formation with a hardenable resin composition; and
allowing the polyamino-functionalized nanoparticles to at least partially cure the hardenable resin composition, whereby the cured hardenable resin composition consolidates at least a portion of the unconsolidated particulates in the subterranean formation.

2. The method of claim 1, wherein the polyamino-functionalized nanoparticles comprise a nanoparticle core comprises at least one material selected from the group consisting of: silica, alumina, iron II oxide, iron III oxide, nickel oxide, zinc oxide, magnesium oxide, boron nitride, aluminum nitride, elemental carbon, and any combination thereof.

3. The method of claim 1, wherein the polyamino-functionalized nanoparticles comprise one or more amino-terminated polymers, at least one of the amino-terminated polymers selected from the group consisting of: polyethyleneimine, polypropyleneimine, polyamidoamine, polylysine, poly(dimethylaminoethyl methacrylate), and any combination thereof.

4. The method of claim 1, wherein the polyamino-functionalized nanoparticles are coated on particulates suspended in the treatment fluid.

5. The method of claim 1, wherein the treatment fluid further comprises a hardenable resin composition.

6. A treatment fluid composition for treating a subterranean formation, the treatment fluid composition comprising a base liquid and particulates, wherein
the particulates are at least partially coated with polyamino-functionalized nanoparticles and a hardenable resin composition, and
the polyamino-functionalized nanoparticles comprise a nanoparticle core that comprises at least one material selected from the group consisting of silica, alumina, iron II oxide, iron III oxide, nickel oxide, zinc oxide, magnesium oxide, boron nitride, aluminum nitride, elemental carbon, and any combination thereof.

7. The treatment fluid composition of claim 6, wherein the polyamino-functionalized nanoparticles comprise one or more polyamino-terminated polymers, at least one of the amino-terminated polymers selected from the group consisting of polyethyleneimine, polypropyleneimine, polyamidoamine, polylysine, poly(dimethylaminoethyl methacrylate), and any combination thereof.

8. The treatment fluid composition of claim 6, wherein the polyamino-terminated polymers comprise 200 terminal amino functionalities or more per polymer.

9. The treatment fluid composition of claim 8, wherein at least a portion of the polyamino-terminated polymers is modified to include terminal boron trifluoride functionalities.

10. A method comprising:
providing a sand control screen assembly disposed within a wellbore penetrating a subterranean formation;
providing a treatment fluid comprising a base fluid, a plurality of gravel particulates, and a hardening agent comprising polyamino-functionalized nanoparticles; and
forming a gravel pack proximal to the sand control screen assembly with the gravel packing treatment fluid.

11. The method of claim 10, wherein the treatment fluid further comprises a hardenable resin composition.

12. The method of claim 11, wherein forming a gravel pack comprises allowing the hardening agent comprising polyamino-functionalized nanoparticles to at least partially consolidate the gravel pack.

13. The method of claim 12, allowing the hardening agent comprising polyamino-functionalized nanoparticles to at least partially consolidate the gravel pack comprises allowing the hardening agent comprising polyamino-functionalized nanoparticles and hardenable resin composition to cure.

14. The method of claim 13, wherein the treatment fluid does not comprise a catalyst to promote curing of the hardening agent comprising polyamino-functionalized nanoparticles and hardenable resin composition.

15. The method of claim 10, wherein the polyamino-functionalized nanoparticles comprise a nanoparticle core composed of silica and a plurality of branched polyamidoamine polymers.

16. The method of claim 10, wherein at least a portion of the hardening agent comprising polyamino-functionalized nanoparticles is provided in a coating on the surface of the gravel particulates.

\* \* \* \* \*